United States Patent [19]
Güttner et al.

[11] Patent Number: 5,181,306
[45] Date of Patent: Jan. 26, 1993

[54] METHOD OF MAKING LASER GYRO RESONATOR BLOCKS

[75] Inventors: Arnold Güttner, Königsbronn; Jobst Herrmann, Aalen; Karl-H. Simon, Stuttgart, all of Fed. Rep. of Germany

[73] Assignee: Carl-Zeiss-Stiftung, Heidenheim, Fed. Rep. of Germany

[21] Appl. No.: 831,891

[22] Filed: Feb. 6, 1992

[30] Foreign Application Priority Data

Feb. 8, 1991 [DE] Fed. Rep. of Germany ....... 4103789

[51] Int. Cl.$^5$ ............................................. B23P 17/00
[52] U.S. Cl. ........................................ 29/413; 29/414; 29/463
[58] Field of Search ................. 29/412, 413, 414, 463; 356/350; 372/94, 107; 455/609

[56] References Cited

U.S. PATENT DOCUMENTS

| | | | |
|---|---|---|---|
| 3,606,035 | 9/1971 | Gantley | 29/413 X |
| 3,982,204 | 9/1976 | Andringa | 356/350 X |
| 4,434,416 | 2/1984 | Schonberger | 29/414 X |
| 4,678,335 | 7/1987 | Berg | 356/350 |
| 4,727,638 | 3/1988 | Altmann et al. | |
| 4,821,281 | 4/1989 | Lind et al. | 356/350 X |
| 5,056,920 | 10/1991 | Ahonen et al. | 356/350 |
| 5,088,824 | 2/1992 | Killpatrick et al. | 356/350 |

FOREIGN PATENT DOCUMENTS 4009728 10/1990 Fed. Rep. of Germany .

Primary Examiner—Timothy V. Eley
Attorney, Agent, or Firm—Walter Ottesen

[57] ABSTRACT

The invention is directed to a method of making ring laser resonator blocks according to the sandwich principle. Channel and hollow chamber structures are machined into two plates of a multiple expansion of a resonator block. The structures in the blocks complement each other. The plates machined in this manner are placed one atop the other and positioned in correspondence to the structures and joined to each other and thereafter separated into individual resonator blocks.

17 Claims, 8 Drawing Sheets

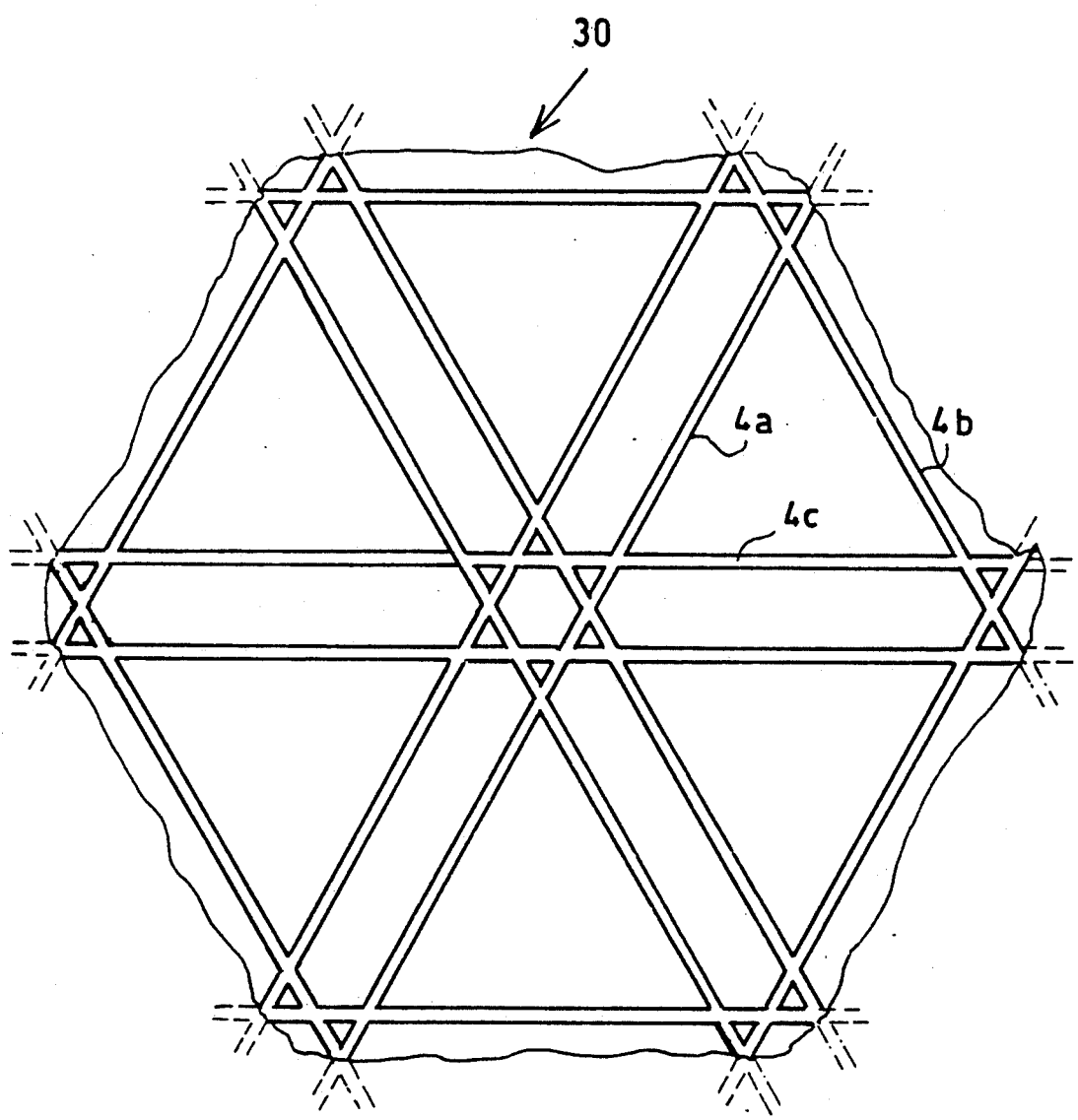

METHOD OF MAKING LASER GYRO RESONATOR BLOCKS

FIELD OF THE INVENTION

The invention relates to a method for making ring laser resonator blocks for laser gyros assembled from component parts.

BACKGROUND OF THE INVENTION

Laser gyros are optical rotational-speed sensors wherein two laser beams rotate in mutually opposite directions in a closed loop for measuring angular velocities. The path of the laser light is formed in the laser block as a multisegment channel having a multi-cornered outline, preferably a triangular outline, and with resonator mirrors arranged at the corners. The path of the laser light is so formed in the surfaces of the component parts that the segment channels are partitioned along their longitudinal axes and complement each other when the component parts are connected to form a closed tunnel.

Laser gyros are used as angular velocity sensors in navigation systems. They are based on the measurement of a rotational movement by means of a comparison of the oscillating frequencies of two monochromatic light beams running in mutually opposite directions in a closed loop in a ring laser. The difference of the frequency of a first light beam, which rotates in the rotational direction of the loop, to the frequency of a second light beam, which rotates opposite to said rotational direction of the loop, is proportional to the angular velocity to be measured.

A resonator block of suitable material guides the laser light in a closed loop. The channels for the path of the laser light, which is defined by mirrors, as well as recesses for accommodating electrodes for the laser operation and further ancillary means are formed in the resonator block. The closed loop of the light channel is configured as a polygon in known arrangements and is preferably a triangle and is referred to in the following as a "beam triangle".

U.S. Pat. No. 4,727,638 discloses a method of making a plurality of ring laser resonator blocks from a starting material formed to have a bar-shape and is incorporated herein by reference. In the bar-shaped starting material, bores are formed for the beam triangles, for the electrode receptacles and for other ancillary means. The individual resonator blocks are obtained from the bar by slicing the same from the bar.

The introduction of bores into the bar material is difficult with the precision desired because of the limited accessibility and is unsatisfactory when viewed in economic terms.

Published German patent application 4,009,728 discloses a method for making a resonator block (base body) for a ring laser. This method utilizes two component bodies each having a partitioned surface. The method is based upon forming channels in these bodies which are partitioned along their longitudinal axes whereafter the completed component bodies are joined to each other at their partitioned surfaces. This method is not efficient for producing large numbers.

SUMMARY OF THE INVENTION

It is an object of the invention to provide a method of making ring laser resonator blocks which ensures a good use of the volume of the resonator block and a cost-effective mass production.

The method of the invention is for making a plurality of ring laser resonator blocks wherein each resonator block defines a closed loop path in which two laser beams propagate in mutually opposite directions for measuring angular velocities. Each of the resonator blocks includes two component parts sandwich joined to each other to define a resonator block with the closed loop path being defined by a plurality of tunnel segments interconnected to form an outline having a plurality of corners with respective resonator mirrors mounted at the corners. The method includes the steps of: providing a first plate having a first flat surface subdivided by a plurality of imaginary lines into the first parts of respective ones of the resonator blocks; providing a second plate having a second flat surface subdivided by a plurality of imaginary lines into the second parts of respective ones of the resonator blocks; forming a plurality of intersecting channels in at least one of the flat surfaces for defining a plurality of interconnected channel segments arranged along the closed loop paths of corresponding ones of the blocks; placing the plates one atop the other to form a composite sandwich structure with the plates being joined at the flat surfaces in a vacuum-tight manner with the other flat surface and the interconnected channel segments of each of the closed loop paths forming the plurality of tunnel segments interconnected to define the closed loop paths for corresponding ones of the resonator blocks; then separating the composite sandwich structure along the imaginary lines to form the plurality of resonator blocks; and, forming mounting surfaces at the corners of each of the blocks and mounting the resonator mirrors on respective ones of the mounting surfaces for reflecting the beams between mutually adjacent tunnel segments.

The recesses for the channels and ancillary means can be formed in both plates symmetrically or asymmetrically to their longitudinal axes by means of grinding tools and milling tools or by pressing while the resonator block material is in a plastic state.

BRIEF DESCRIPTION OF THE DRAWINGS

The invention will now be described with reference to the drawings wherein:

FIGS. 4a to 4e show various manufacturing steps of an array of ring laser resonator blocks made according to the method of the invention;

DESCRIPTION OF THE PREFERRED EMBODIMENTS OF THE INVENTION

Figure 1:
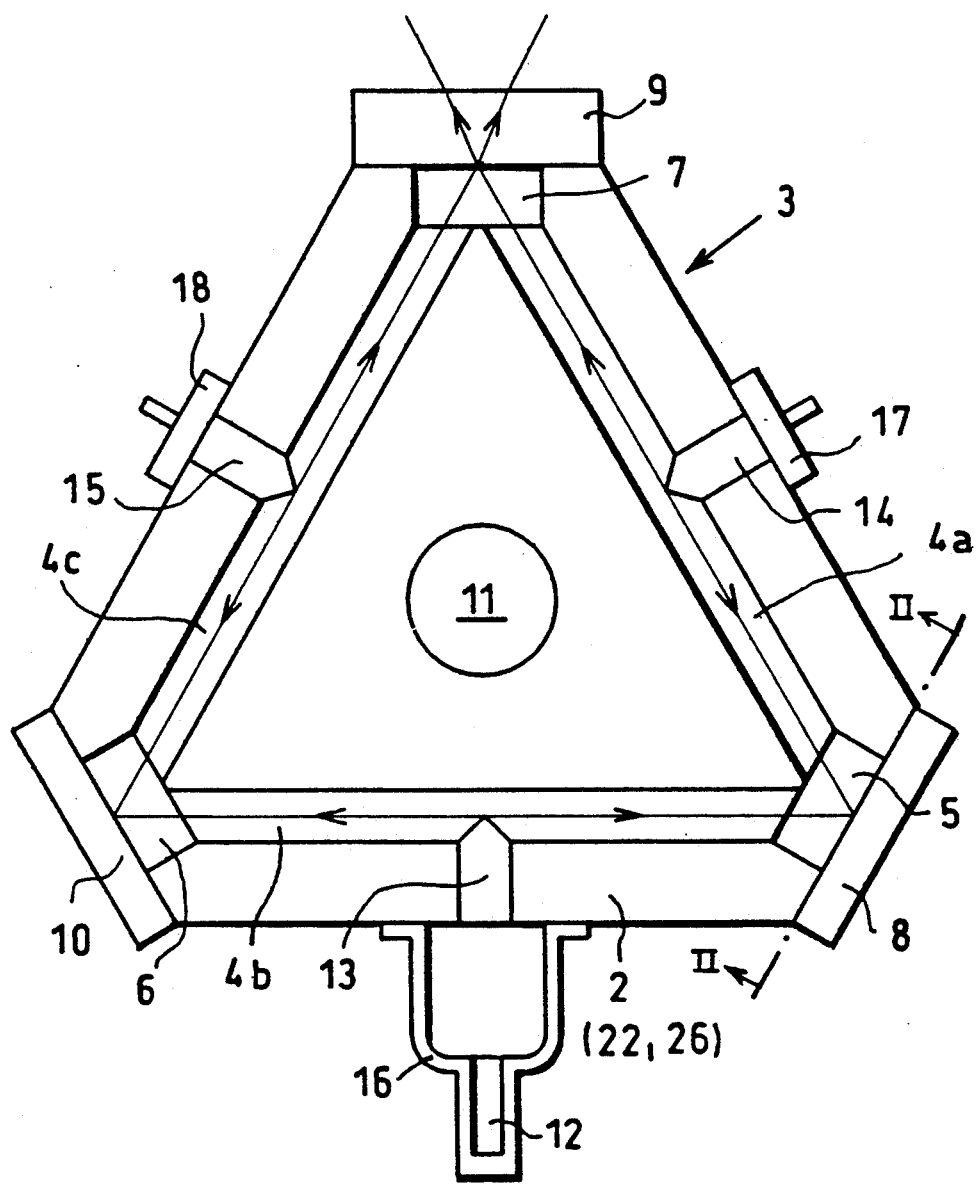
FIG. 1 is a section view of a typical ring laser as known in the art.

In FIG. 1, reference numeral 3 identifies a typical ring laser resonator block made of a suitable material such as Zerodur wherein a beam triangle is arranged. Tunnels (4a, 4b, 4c) for the laser beam are formed in the block material. The ends of the tunnels (4a, 4b, 4c) meet along their centers which intersect each other near the corners of the triangular ring laser resonator block 3, hereinafter referred to as block 3, so that the tunnels define a triangular channel system within the block. In this embodiment, cylindrical recesses (5, 6, 7) are machined into the block at the location where the tunnels (4a, 4b, 4c) intersect. The recesses (5, 6, 7) accommodate a gas reservoir.

At the partition interface of tunnel 4a with tunnel 4b, the side surface of the block 3 is machined off at right angles to the beam triangle. A mirror 8 can be attached to this side surface by means of optically contacting or another advantageous joining technique. The mirror 8 reflects the light from the tunnel 4a into the tunnel 4b and from tunnel 4b into tunnel 4a. The mirror 8 has a dielectric coating which is so configured that it nearly completely reflects the desired light frequency. Mirrors 9 and 10 are attached in a like manner to the block 3 at the respective partition interfaces conjointly defined by tunnel 4a and tunnel 4c and by tunnels 4c and 4b.

Channels leading to the cathode 16 and the anodes 17 and 18 are identified by reference numerals 13, 14 and 15, respectively. During operation, two gas discharges burn between the cathode and the two anodes which effect the light amplification required for the laser process within the ring laser. In this embodiment, a through bore 11 is provided at the center of the block 3 for accommodating a dither drive.

The closeable pump connection 12 is required for evacuating the completed ring laser and for filling the same with laser gas. The pump connection 12 is generally combined with one of the electrodes as shown in FIG. 1 wherein cathode 16 is combined with the pump connection.

A helium-neon gas mixture is usually used as a laser gas with the neon component having approximately the same parts of neon isotopes of atomic weight 20 and 22. The red transition of the wavelength 632.8 nm is utilized.

In the section views of FIGS. (2a, 2b) and (3a, 3b), the method of making a resonator block according to the sandwich principle is shown. FIGS. (2a, 2b) show an asymmetrically formed discharge channel, for example channel 4a, in longitudinal section. FIGS. (3a, 3b) show a symmetrically formed discharge channel in longitudinal section.

Figure 2A:
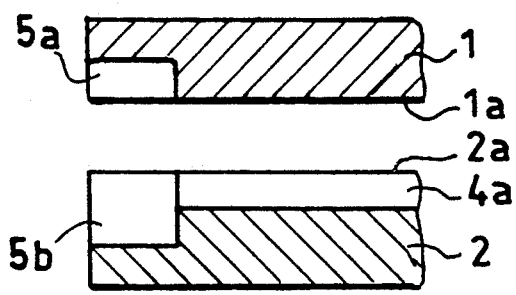
FIGS. 2a and 2b are partial views, in section, of a ring laser resonator block made according to the method of the invention of two component parts with the discharge channels being formed asymmetrically in the component parts.

FIG. 2a shows how the shape of the component channel 4a and a portion 5a of recess 5 (for example a gas supply bore) are machined into the surface 1a of the component part 1. The other portion 5b of the recess 5 is shown machined into the surface 2a of component part 2.

Figure 2B:
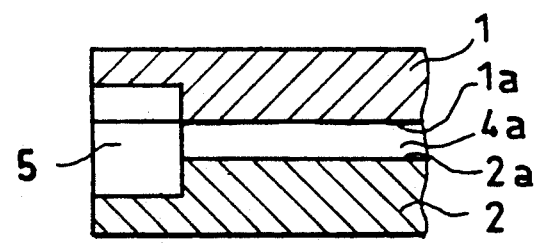
Figure 3A:
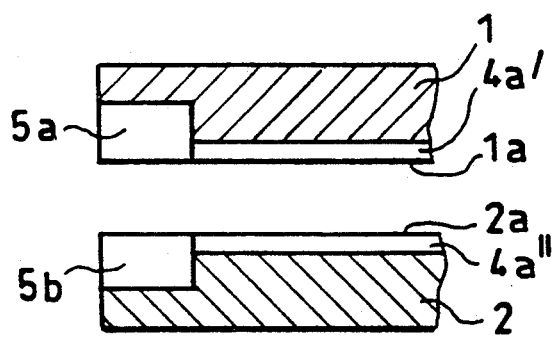
FIGS. 3a and 3b show a partial view, in section, of a ring laser resonator block produced according to the method of the invention from two component parts wherein the discharge channels are formed symmetrically in the component parts.
Figure 3B:
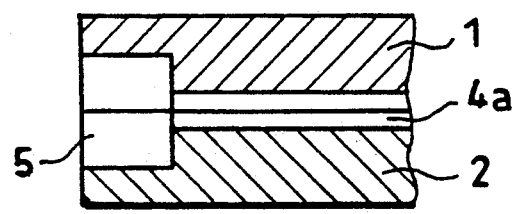

In the embodiment shown in FIG. 3a, the respective halves (4a', 4a'') of the component channel 4a and respective halves (5a, 5b) of the recess 5 are machined into the surfaces 1a and 2a of the component parts 1 and 2, respectively. The component channel 4a and the recess 5 are partitioned along their longitudinal axes. As shown in FIGS. 2a and 3a, the component bodies 1 and 2 are positionally placed one over the other and mutually joined (FIGS. 2b, 3b) so as to be vacuum tight so that the preformed structures complement each other to form a unit.

FIGS. 4a to 4e show how a large number of resonator blocks can be produced from two plates. These blocks correspond in their arrangement principally to the embodiment shown in FIG. 1 with parts having the same function being provided with the same reference numeral. Two plates 30 each having half the thickness of the finished resonator block are provided with the precise discharge channels, the bores for receiving the dither drive, the electrodes and the gas supply in the area of the mirror.

Figure 4B:
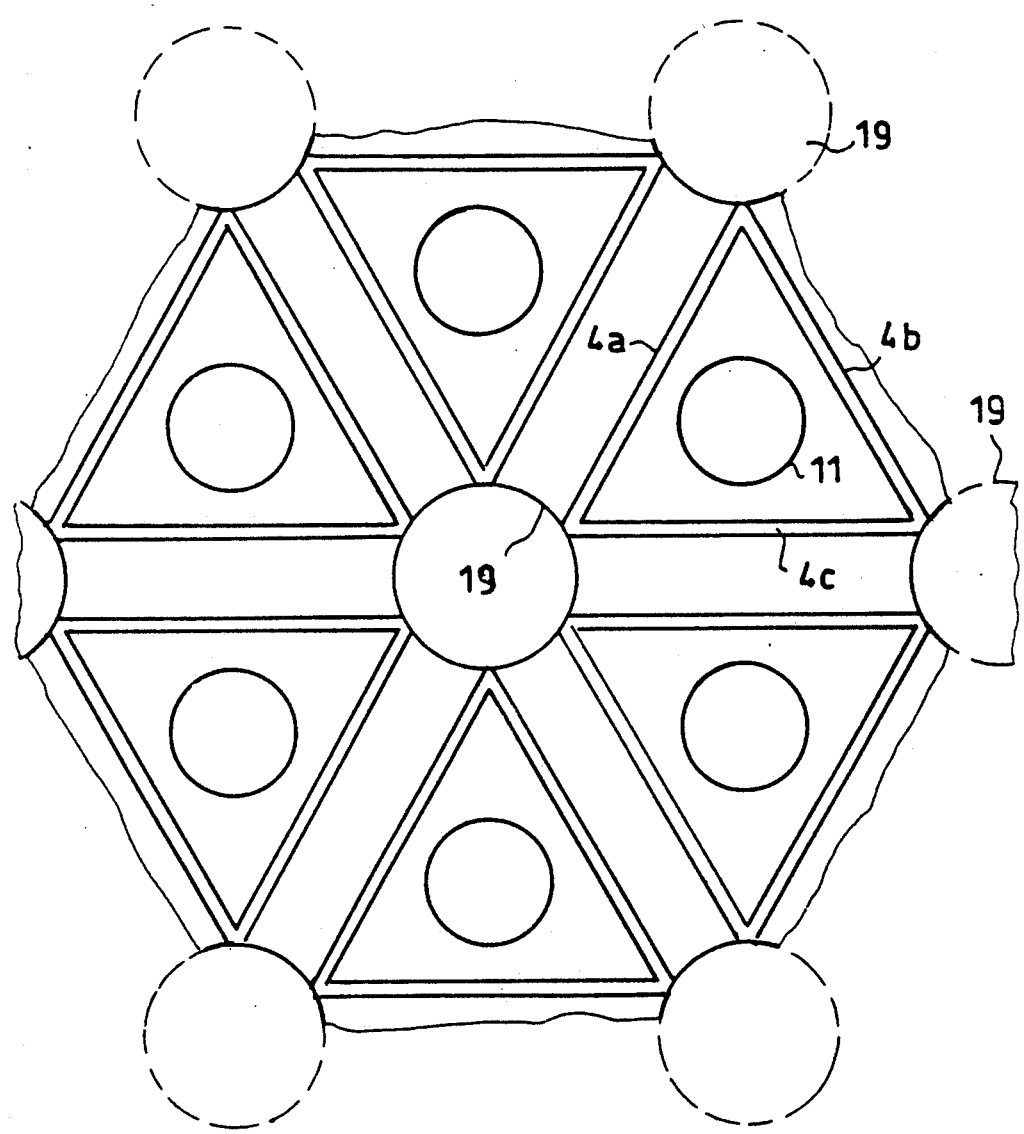
Figure 4C:
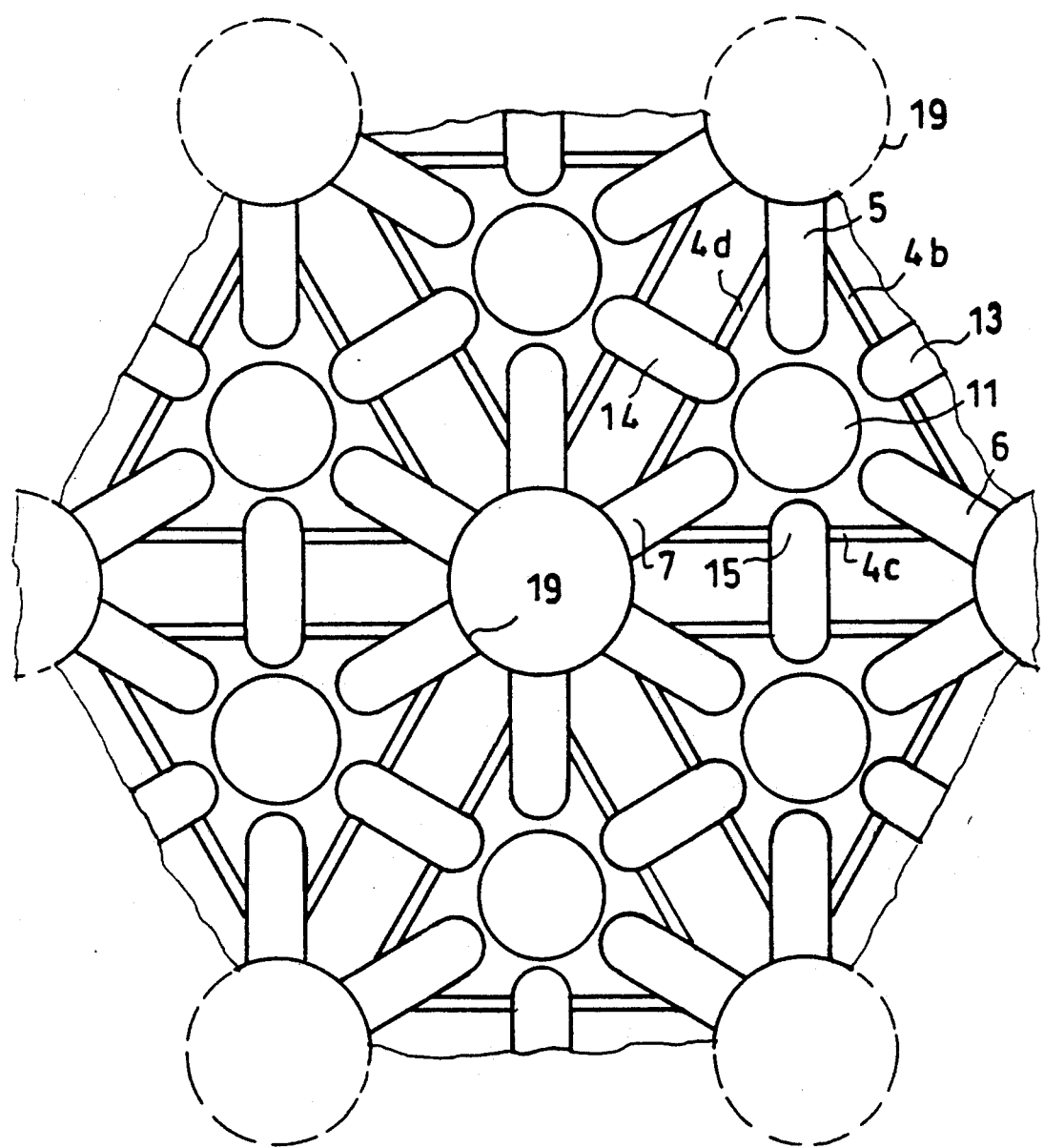

The arrangement of the discharge channels (4a, 4b, 4c) is shown in the plan view of FIG. 4a. FIG. 4b shows the arrangement of the dither bores 11 and FIG. 4c shows the arrangement of the electrode bores (13, 14, 15) and the gas supply bores (5, 6, 7) in the areas of the respective mirrors. The cross section of the component channels is preferably rectangular or semicircular and the ratio of depth to width of the channels amounts advantageously to 1:2. A common preprocessing is obtained by bores 19 in the area of the mirror mounting surfaces of six mutually adjacent blocks; that is, unneeded material can be effectively removed with the aid of a trepanning cutter.

Figure 4D:
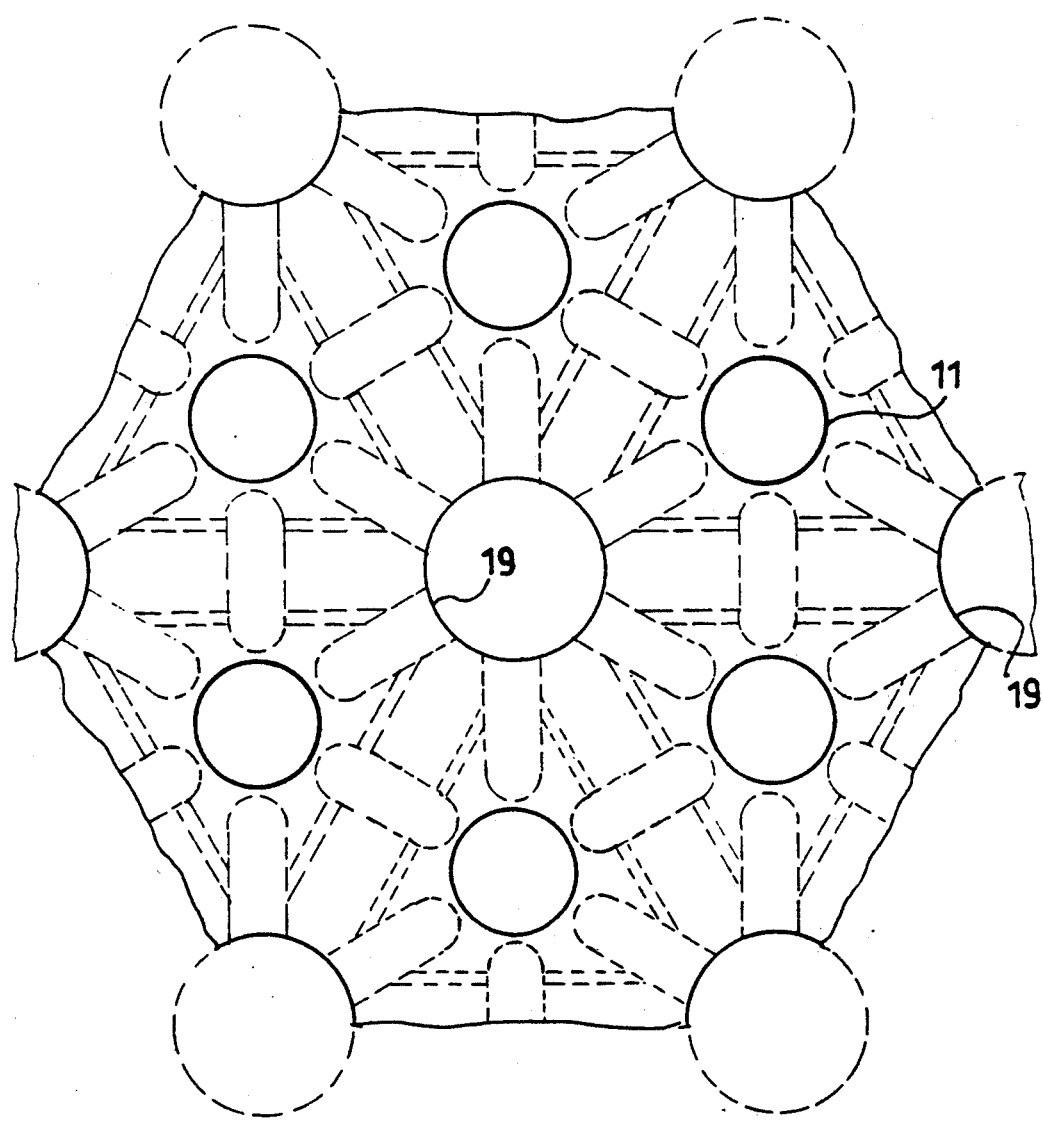

In the next method step and as shown in FIG. 4d, two identical plates, which each have the structure of a plurality of resonator blocks, are placed one atop the other and are so positioned that the halves of the discharge channels and the halves of the other recesses complement each other. By means of a suitable joining process adapted to the block material such as soldering, fusing, or welding, preferably in a continuous furnace, an array of resonator block blanks which are still interconnected are produced.

Figure 4E:
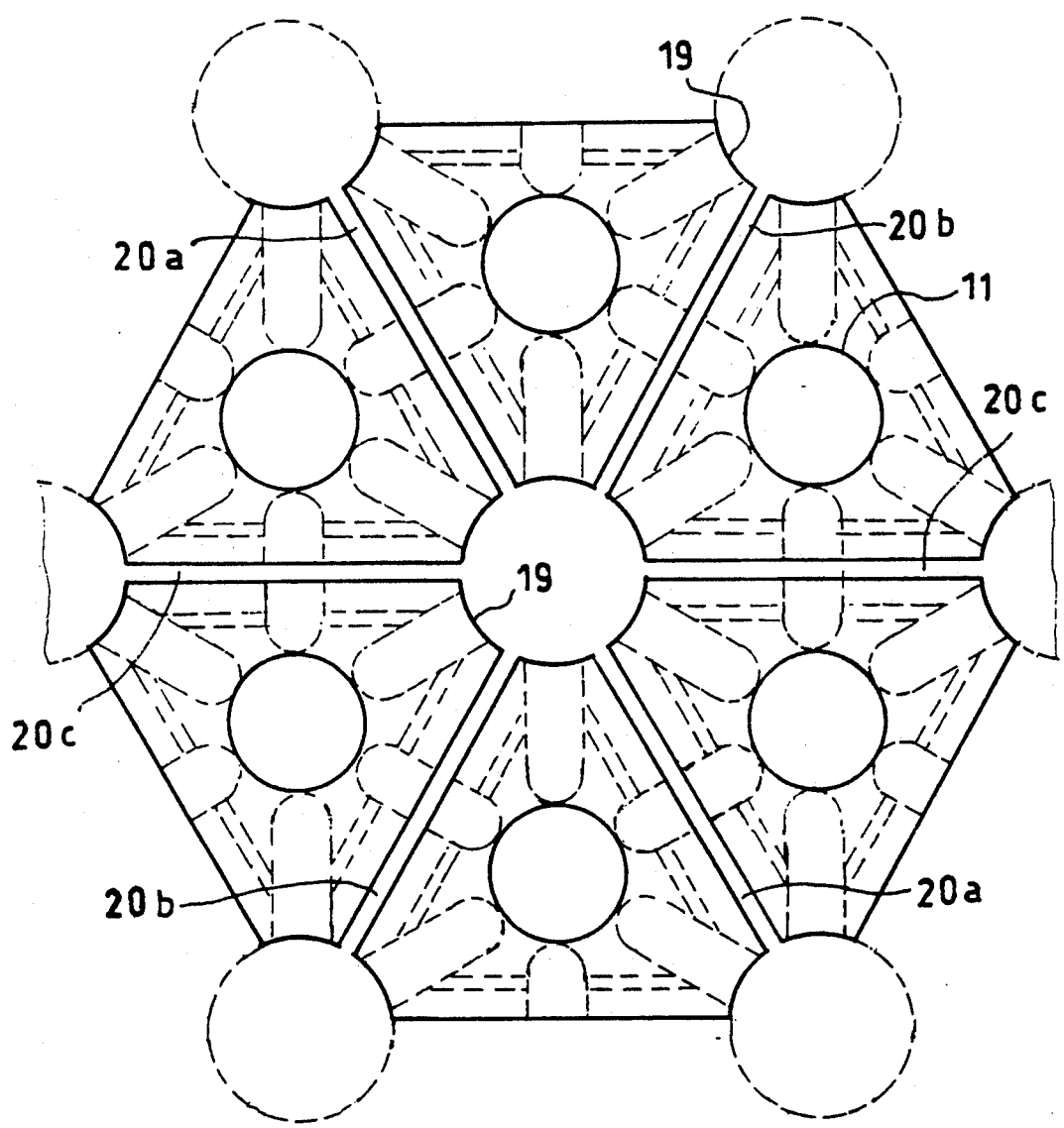

Thereafter, in the method step shown in FIG. 4e, the resonator block blanks are separated with a suitable tool along the lines (20a, 20b, 20c). With respect to the joining surfaces, a machining of the discharge channels and of the gas supply chambers with a grinding or milling tool adapted to the block material is possible for removing chips. This leads to a savings when a larger number of resonator blocks is made in a single work step.

The final machining of the mounting surfaces for the laser mirrors (8, 9, 10) preferably takes place in a greater number of blocks which are mounted on an arbor. In a preferred alternate procedure, the final machining of the mirror mounting surfaces can be performed before separation. This provides a high accuracy as to alignment because of the size of the block array and this is transferred to all of the individual blocks.

Figure 5A:
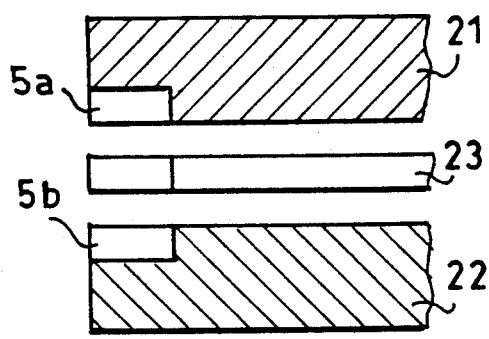
FIGS. 5a to 5d are partial views, in section, of a ring laser resonator block made according to the method of the invention of three component parts; and, FIGS. 6a and 6b are partial views, in section, of a ring laser resonator block produced from three component parts.
Figure 5B:
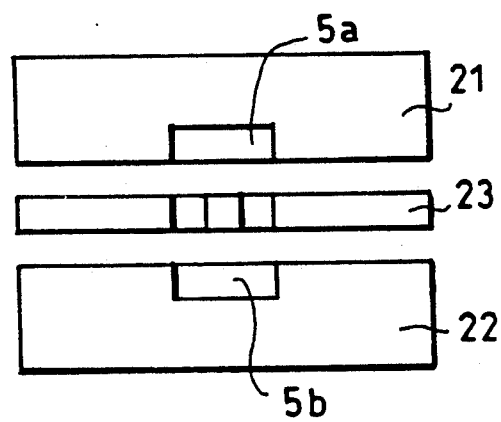
Figure 5C:
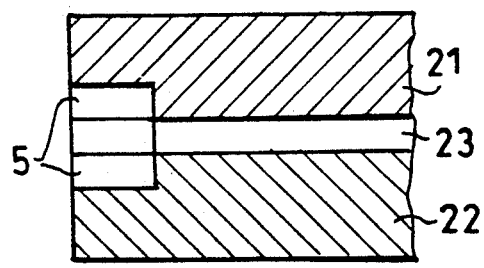
Figure 5D:
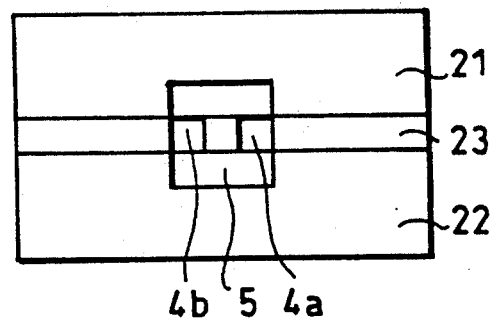

FIGS. 5a to 5d show an embodiment for making a ring laser resonator block from three component bodies. FIG. 5a shows the assembly of the ring laser resonator block from the cover plates (21, 22) and channel means 23. The channel means can be realized by parallel spacer pieces which are suitably formed and positioned. Portions (5a, 5b) of a recess 5, for example for a gas supply chamber, are provided in respective cover plates 21 and 22 as shown. FIG. 5c shows the individual parts joined to form a unit. FIGS. 5b and 5d show the subject matter shown in FIGS. 5a and 5c in cross section along partition line II—II of FIG. 1.

Figure 6A:
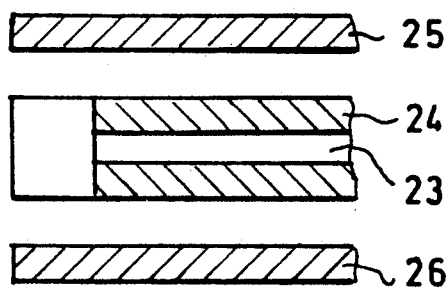
Figure 6B:
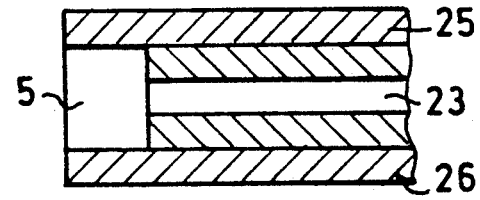

FIGS. 6a and 6b show that the resonator blocks can also be produced in that the channels 23 are made by bores formed in a block 24. The drilled block 24 is complemented by smooth cover plates (25, 26) which define the outer walls of the gas reservoir 5. In the case of the three component bodies it can be advantageous to make the cover plates (21, 22, 25, 26) or the spacer pieces (23) of a metal having a thermal coefficient of expansion which is comparable with that of the other components which are made of a dielectric material.

Some material require that all inner surfaces which are machined and all connecting surfaces must be etched to remove microfissures. A significant savings in cost is obtainable when all channels and supply bores are formed by a pressing process or casting process so that a follow-up machining is unnecessary. Only the production of plane connecting surfaces can require a large surface follow-up machining.

The advantages obtained with the method according to the invention are seen in that it allows an efficient high-volume production of resonator blocks and, on the other hand, because of the initial free accessibility of the block interior, machining and forming methods can be applied which are distinguished by high precision and/or efficiency. The possibility of clearing the block interior extensively and to use the same as a gas supply volume is especially advantageous with extremely small cost-effective ring lasers having, for example, triangular beam edge lengths of approximately 2 cm. By that, operational life and laser service and shelf life can be enhanced.

It is evident that the sandwich method can be transferred without difficulty to other resonator configurations such as to isosceles triangles and quadrangles such as squares, rectangles and rhombi. FIGS. 1 to 6 do not restrict the possible channel arrangement and dimensions and the arrangement and shapes of the ancillary means. Accordingly, for example all three electrode feeds can be arranged in the area of one channel such as channel 4b and the channels (4a, 4c) can have a significantly larger cross section in order to serve as gas reservoir.

It is understood that the foregoing description is that of the preferred embodiments of the invention and that various changes and modifications may be made thereto without departing from the spirit and scope of the invention as defined in the appended claims.

What is claimed is:

1. A method of making a plurality of laser gyro resonator blocks wherein each resonator block defines a closed loop path in which two laser beams rotate in mutually opposite directions for measuring angular velocities, each of the resonator blocks including two component parts sandwich joined to each other to define a resonator block with the closed loop path being defined by a plurality of tunnel segments interconnected to form an outline having a plurality of corners with respective resonator mirrors mounted at the corners, the method comprising the steps of:

providing a first plate having a first flat surface subdivided by a plurality of imaginary lines into said first parts of respective ones of said resonator blocks;

providing a second plate having a second flat surface subdivided by a plurality of imaginary lines into said second parts of respective ones of said resonator blocks;

forming a plurality of interconnected channels in at least one of said flat surfaces for defining a plurality of interconnected channel segments arranged along the closed loop paths of corresponding ones of said blocks;

placing said plates one atop the other to form a composite sandwich structure with said plates being joined at said flat surfaces in a vacuum-tight manner with said other flat surface and said interconnected channel segments of each of said closed loop paths forming said plurality of tunnel segments interconnected to define said closed loop paths for corresponding ones of said resonator blocks;

then separating said composite sandwich structure along said imaginary lines to form the plurality of resonator blocks; and, forming mounting surfaces at the corners of each of said blocks for mounting said resonator mirrors on respective ones of said mounting surfaces for reflecting said beams between mutually adjacent tunnel segments.

2. The method of claim 1, wherein first and second pluralities of intersecting channels are formed in said flat surfaces, respectively, for defining first and second pluralities of interconnected channel segments arranged along the closed loop paths of corresponding ones of said blocks; and, said first and second pluralities of interconnected channel segments conjointly forming said tunnel segments to define said closed loop paths for corresponding ones of said resonator blocks when said plates are placed one atop the other.

3. The method of claim 2, wherein each of the resonator blocks includes additional recesses for ancillary means; and, wherein first and second pluralities of cutouts are formed in said plates, respectively.

4. The method of claim 3, wherein said cutouts and said interconnected tunnel segments define respective longitudinal axes and said tunnel segments are formed symmetrically in said two plates with respect to said axes.

5. The method of claim 3, wherein said cutouts and said interconnected tunnel segments define respective longitudinal axes and said tunnel segments are formed asymmetrically in said two plates with respect to said axes.

6. The method of claim 3 wherein said cutouts and said interconnected tunnels are made with grinding and milling tools.

7. The method of claim 3, wherein said cutouts and said interconnected tunnels are recesses pressed into said plates.

8. The method of claim 3, wherein said plates are made by a pressing process.

9. The method of claim 3, wherein said plates are made by casting.

10. The method of claim 3, wherein said plates are made of dielectric material.

11. The method of claim 3, wherein said dielectric material is selected from the group consisting of: glass-ceramic, glass and ceramic.

12. A method of making a plurality of ring laser resonator blocks wherein each resonator block defines a closed loop path in which two laser beams rotate in mutually opposite directions for measuring angular velocities, each of the resonator blocks including two component parts sandwich joined to each other to define a resonator block with the closed loop path being defined by a plurality of tunnel segments interconnected to form an outline having a plurality of corners with respective resonator mirrors mounted at the corners, the method comprising the steps of:

providing a first plate having a first flat surface subdivided by a plurality of imaginary lines into said first parts of respective ones of said resonator blocks;

providing a second plate having a second flat surface subdivided by a plurality of imaginary lines into said second parts of respective ones of said resonator blocks;

arranging a plurality of individual plate elements between said plates so as to define a plurality of interconnected channel segments arranged along the closed loop paths of corresponding ones of said blocks;

joining said plates at said flat surfaces to said plate elements in a vacuum-tight manner with said interconnected channel segments of each of said closed loop paths forming said plurality of tunnel segments interconnected to define said closed loop paths for corresponding ones of said resonator blocks;

then separating said composite sandwich structure along said imaginary lines to form the plurality of resonator blocks; and, forming mounting surfaces at the corners of each of said blocks for mounting said resonator mirrors on respective ones of said mounting surfaces for reflecting said beams between mutually adjacent tunnel segments.

13. The method of claim 12, wherein each of the resonator blocks includes additional recesses for ancillary means; and, wherein said recesses are formed in said flat surfaces for coacting with said plate elements to accommodate said additional elements in each of said blocks.

14. The method of claim 13, wherein said flat plates are made of a metal adapted to said plate elements with respect to the thermal coefficient of expansion of said plate elements.

15. The method of claim 13, wherein said individual plate elements are made of a metal adapted to said plates with respect to the thermal coefficient of expansion of said plates.

16. A method of making a plurality of ring laser resonator blocks wherein each resonator block defines a closed loop path in which two laser beams rotate in mutually opposite directions for measuring angular velocities, each of the resonator blocks including two component parts sandwich connected to each other to define a resonator block with the closed loop path being defined by a plurality of tunnel segments interconnected to form an outline having a plurality of corners with respective resonator mirrors mounted at the corners, the method comprising the steps of:

providing a first plate having a first flat surface subdivided by a plurality of imaginary lines into said first parts of respective ones of said resonator blocks;

providing a second plate having a second flat surface subdivided by a plurality of imaginary lines into said second parts of respective ones of said resonator blocks;

providing a block and drilling a plurality of bores into said block for defining a plurality of interconnected tunnel segments arranged along the closed loop paths of corresponding ones of said blocks;

sandwiching said block between said plates to form a composite sandwich structure with said plates being joined at said flat surfaces in a vacuum-tight manner to said block;

then separating said composite sandwich structure along said imaginary lines to form the plurality of resonator blocks; and, forming mounting surfaces at the corners of each of said blocks for mounting said resonator mirrors on respective ones of said mounting surfaces for reflecting said beams between mutually adjacent tunnel segments.

17. The method of claim 16, wherein said plates are made of a metal adapted to said block with respect to the thermal coefficient of expansion of said block.

* * * * *